United States Patent [19]

Koeppel

[11] 4,300,324
[45] Nov. 17, 1981

[54] ANHYDRITE CELLULAR CONCRETE COMPOSITE BUILDING ELEMENTS AND THEIR METHOD OF MANUFACTURE

[75] Inventor: Robert Koeppel, Bron, France

[73] Assignee: Produits Chimiques Ugine Kuhlmann, Paris, France

[21] Appl. No.: 140,750

[22] Filed: Apr. 16, 1980

Related U.S. Application Data

[60] Division of Ser. No. 969,209, Dec. 13, 1978, Pat. No. 4,233,080, which is a continuation of Ser. No. 852,063, Nov. 16, 1977, abandoned.

[30] Foreign Application Priority Data

Nov. 30, 1976 [FR] France .............................. 76 38489
Dec. 21, 1976 [FR] France .............................. 76 36028

[51] Int. Cl.³ .................... E04C 2/04; B28B 21/02
[52] U.S. Cl. ........................... 52/612; 264/42; 264/46.4
[58] Field of Search ............... 264/42, 46.4; 52/612

[56] References Cited

U.S. PATENT DOCUMENTS

| | | | |
|---|---|---|---|
| 1,439,410 | 12/1922 | Gray | 52/612 X |
| 1,452,432 | 4/1923 | Miller | 52/612 X |
| 1,702,730 | 2/1929 | Hite | 264/42 X |
| 3,454,688 | 7/1969 | Foster et al. | 264/42 |
| 3,691,003 | 9/1972 | Elischer | 156/78 X |

FOREIGN PATENT DOCUMENTS

| | | | |
|---|---|---|---|
| 412437 | 12/1945 | Italy | 52/612 |
| 930502 | 7/1963 | United Kingdom | 264/42 |
| 1061455 | 3/1967 | United Kingdom | 264/42 |

*Primary Examiner*—Philip Anderson
*Attorney, Agent, or Firm*—Pennie & Edmonds

[57] ABSTRACT

New light, strong, non-shrinking cellular concrete having good thermal and acoustic insulating properties prepared by incorporating aluminum and an alkaline agent capable of producing a gas when reacted with the aluminum within an anhydrite binder, placing the mixture in a mold, and permitting it to expand to a cellular product and cure. The products are useful as building materials. The invention includes the production of building elements comprising the cellular anhydrite product as described above adhered to at least one layer of a substantially non-cellular or dense facing layer made with an anhydrite binder or sandwiched between and adhered to non-cellular facing layers both made with an anhydrite binder.

13 Claims, No Drawings

ANHYDRITE CELLULAR CONCRETE COMPOSITE BUILDING ELEMENTS AND THEIR METHOD OF MANUFACTURE

This is a division of application Ser. No. 969,209, filed Dec. 13, 1978, now U.S. Pat. No. 4,233,080, issued Nov. 11, 1980, which in turn is a continuation of application Ser. No. 852,063 filed Nov. 16, 1977, now abandoned.

BACKGROUND OF THE INVENTION

It has long been known to produce cellular concrete based on Portland cement, silica sand, and lime by formation of hydrogen gas therein caused by the reaction of aluminum powder with a suitable reactant. The products obtained by this method have low mechanical properties, from 10 to 15 bars under compression at 28 days, measured according to French standard NF P 15451, for a specific gravity of 0.50, and under normal conditions of hardening in the air, suffer a shrinkage which may be in excess of 5 mm/m. This shrinkage which extends over a year is the cause of cracking and powdering which may result in destruction of the material. Therefore, it is necessary to store products for a minimum period of 70 days, which necessitates considerable storage areas. If it is desired to avoid shrinkage and enhance mechanical properties, it is necessary to resort, after partial hardening, to autoclave treatment lasting 12 to 24 hours at a temperature of 170° to 200° C. at a pressure of 8 to 10 atm. This treatment is particularly burdensome in terms of investment and power requirement.

It is also known to produce composite elements comprising a light-weight central layer of alveolar structure made from board or of a cellular structure made from polymers and sandwiched between two facing layers made from plaster. But said elements present the disadvantage of having to be assembled by gluing the different layers together. Also their mechanical properties are poor, which prevents them being used as load bearers such as in building construction.

It is also known to produce, by molding, composite plaster tiles comprising an aleveolar central layer sandwiched between two facing layers. But said tiles exhibit the disadvantage of having insufficient mechanical strength to enable them to be assembled into load-bearing constructions.

It is further known to produce composite elements comprising a cellular central layer made from plaster and sandwiched between two non-cellular facing layers likewise made from plaster. Such elements can be produced by a method which consists in forming the first facing layer by pouring a plaster paste onto a mold bottom, then forming the cellular central layer by pouring onto the first layer, before the latter is set, a layer of plaster having a porogenic system incorporated therein, then in forming the second facing layer by pouring a plaster layer onto the cellular central layer before the latter has finished setting. However, by this method the making of the central cellular plaster layer is difficult because the porogenic systems used, based on hydrogen peroxide (oxygen generators) or on mixtures of aluminum sulphate and calcium carbonate (carbon dioxide generators), lead to an immediate evolution of gas from the time when the paste is mixed. Thus, not only is a major part of the porogenic system dissipated as a pure loss during the mixing and transfer of the paste from the mixing station into the mold, but it is difficult to obtain a cellular central layer having a properly reproducible density and thickness due to the gas losses which are of a random character. Moreover, these elements exhibit the disadvantage of having insufficient mechanical strength to enable them to be used in load-bearing constructions.

SUMMARY OF THE INVENTION

The present invention relates to a new light and strong non-shrinking cellular concrete made from an anhydrite having good thermal and acoustic insulating properties, incombustible and unaffected by frost which may be used as a building material such as internal and external walls, party walls, ceilings, floors, etc., and to a method of producing the new cellular concrete.

The invention includes a method of producing composite building elements constituted by a cellular layer of low density, exhibiting good thermal insulation, made from an anhydrite and sandwiched between two non-cellular facing layers likewise made from an anhydrite and a method of assembling these composite building elements and reinforcing them by means of pillars or beams fabricated in situ.

DETAILED DESCRIPTION OF THE INVENTION

The base product used according to this invention is an insoluble anhydrite such as anhydrous calcium sulphate, $CaSO_4$, grade II or $\beta$. Insoluble anhydrites are well known and may vary in their origin. The insoluble anhydrite may, for example, be a natural anhydrite or the anhydrite produced as a by-product of the manufacture of hydrofluoric acid by sulphuric acid attack on calcium fluoride. The insoluble anhydrite can also be obtained by calcination of natural gypsum or of gypsums which are by-products of the chemicals industry. In particular, it is possible to use the anhydrite obtained by calcination of a phosphogypsum which is a by-product of the manufacture of phosphoric acid by the wet method. The method of producing such an anhydrite is described in French Patent Application No. 76.00678 of the applicant or U.S. application Ser. No. 756,861, filed Jan. 4, 1977 both of which are incorporated herein by reference.

In order to obtain a material having optimum properties, the anhydrite used according to this invention should be characterized by a granulometry having at least about 15% by weight of particles of a diameter less than about 10 $\mu$m and at least about 20% by weight of particles having a diameter larger than about 20 $\mu$m with an average diameter of between about 5 and 30 $\mu$m. The anhydrite which may be used is likewise characterized by a BLAINE (ASTM Bull. No. 108, 17–20 (1941)) surface area between 1,000 and 8,000 sq.cm/g and preferably between 2,000 and 5,000 sq.cm/g.

The anhydrite as defined above permits the production of non-cellular materials having remarkable mechanical properties. Indeed, when it is mixed in the presence of a suitable catalytic system such as potassium sulphate associated with lime or iron sulphate or zinc sulphate, this anhydrite yields at 28 days, according to the quantity of mixing water used, a flexural strength of 90 to 150 bars and a compression strength of 400 to 800 bars, according to French standard NF P 15451, at a density of 2.0 to 2.3. When the products are cellular, using a porogenic system based on aluminum powder, the cellular product, after 28 days has a flexural strength on the order of 12 bars and a compression strength on the order of 24 bars for a density of 0.55. The anhydrite as defined above is therefore very advantageous for the manufacture of cellular and non-cellular concrete having good mechanical properties and substantially no shrinkage and a very low coefficient of thermic expansion.

The cellular compositions according to the invention are obtained, for example, by mixing: 100 parts by weight of anhydrite, 25 to 55 parts by weight of water, 0.5 to 2 parts by weight of one or more anhydrite setting catalysts, 0.1 to 5 parts by weight of a composition of an alkaline agent capable of reacting with the powdered aluminum to form hydrogen gas, and 0.01 to 0.20 parts by weight of an aluminum powder.

The preferred modus operandi is the following: the anhydrite and water containing the setting catalyst or catalysts are mixed together with the composition containing an alkaline agent for about 2 and ½ minutes, after which the powdered aluminum is added (preferably in suspension in water), and the composite mixed for about 30 more seconds. The mixture is then poured into a mold in which the mixture expands under the effects of releasing hydrogen forming a multitude of small spherical cells which are for the major part closed and in which the expanded mixture is allowed to set.

The composition of alkaline agent used to react with the aluminum may comprise up to 100% of one or more oxides or hydroxides of alkaline earth metals such as magnesium or calcium in the proportion of 0.5 to 3 parts by weight to 100 parts by weight of anhydrite. It is possible likewise to associate with the alkaline earth metal oxides or hydroxides or mixtures thereof, one or more alkaline hydroxides such as the hydroxides of potassium, sodium or lithium in the proportion of 0.1 to 2 parts by weight of anhydrite. It is further possible to eliminate from the alkaline composition, the oxides or hydroxides of alkaline earth metals, and to use only one or more alkaline metal hydroxides in the proportion already indicated for these products. However, the oxides or hydroxides of alkaline earth metals are advantageous because these compounds are used not only for reacting with the powdered aluminum but likewise act as anhydrite setting catalysts and enhance the mechanical properties of the cellular material obtained. The use of one or more oxides or hydroxides of an alkaline metal is not necessary if oxides or hydroxides of alkaline earth metals are used. They may however be advantageous when the reaction of attack on the aluminum is relatively slow. This is the case, for example, when the reaction takes place at a relatively low temperature or when adjuvants are used such as certain water repellants or certain water reducing fluidizers. The composition of alkaline agents may be introduced into a paste in the form of dry powder or in the form of a solution and/or an aqueous suspension in order to have a more homogeneous distribution within the mixture.

The aluminum used in the method according to the invention may take the form of any powder so long as it is sufficiently fine. It is however advantageous to use a lamellar powder or an agglomerated lamellar powder in the form of pellets, as they are called in Anglo-American parlance. It is likewise advantageous to use a powdered aluminum which is free of any fatty substance, so that it disperses easily in an aqueous medium. It is advantageous if the powdered aluminum has a fine film of anhydrous alumina on the particles which avoids any immediate release of hydrogen when the aluminum powder is in an alkaline medium so as to provide a latent time of approximately 1 to 5 minutes when there is no formation of hydrogen. This can be used to advantage to disperse the powdered aluminum in the mixture before pouring the mixture into the mold.

The aluminum powder may also advantageously have a B.E.T. surface area measured with nitrogen at between about 2 and 8 sq.m/g or a granulometry, comprising between about 0 and 50% by weight of particles of a diameter less than about 3 $\mu$m and between about 0 and 20% by weight of particles of a diameter in excess of about 38 $\mu$m with an average diameter of between about 2 and 20 $\mu$m.

The granulometry of the powdered aluminum is very important with regard to the dimension of the cells formed, the finer the powdered aluminum used, the smaller the cells will be.

The powdered aluminum may be introduced into the paste in the form of a dry powder but in order to have a very homogeneous dispersion of the powder in the mixture, it is preferable to introduce the powdered aluminum in the form of a dispersion in water.

In a preferred composition, 100 parts by weight of anhydrite with a BLAINE surface area of 3,000 sq.cm/g, 40 parts by weight of water, 1 part by weight of potassium sulphate, 1 part by weight of calcium hydroxide and 0.1 part by weight of aluminum powder will be used.

The temperature of the various constituents and particularly the temperature of the water should be adjusted in such a way that the mixture under expansion has a well-defined temperature. This temperature, which is that at which the aluminum decomposes, determines the rate of hydrogen formed in relation to the quantity of aluminum and the speed and duration of expansion of the mixture which occurs advantageously within about 10 and 45 minutes, preferably between 15 and 25 minutes. The temperature of reaction to accomplish this should be between 15° and 40° C. and preferably between 20° and 35° C.

It is important that any hydrogen formed be used in the production of cells. For this, it is necessary for the mixture not to be too viscous so that it does not oppose the production of cells and does not cause fissures. However, the mixture should not be too fluid because then the hydrogen would escape without forming cells. Fluidity is essentially regulated by means of the quantity of water used. The optimum quantities of water are a function of the quality and granulometry of the anhydrite. The larger the BLAINE surface area of the anhydrite, the higher the optimum quantity of water will be.

Experience shows that the optimum fluidity of the mixture is reached when the mixture, before the addition of aluminum powder, has a smear diameter of 20 to 22 cm in the SMIDTH test which consists in smearing onto a horizontal brass plate the contents of a ring having an internal diameter of 60.8 mm, an outside diameter of 65.0 mm and a height of 47.0 mm.

The quantity of water used may be reduced by the use of one or more fluidizers. The fluidizers make it possible to reduce the water content down to nearly one-third while retaining the same fluidity. It is thus possible to have more rapid drying and hardening and to obtain higher mechanical properties. The fluidizers which may be used are well known to those skilled in the art and of many varied types. The most effective are the resins of low molecular weight containing sulfonate groups such as the low molecular weight polystyrenesulfonates, or the condensates of low molecular weight of formol with naphthalene, phenol, urea, or malamine and carrying sulfonate groups. The quantity of fluidizer that can be used is between about 0.2 and 2, and preferably 0.5 and 1 part by weight per 100 parts by weight of anhydrite.

The size of the cells formed in the material can advantageously be regulated. The simplest way is to introduce into the composition one or more surfactants such as for example saponin or any suitable synthetic surfactant, a very large number of which are available. The presence of a surfactant in the mixture diminishes the size of the cells. The quantities of surfactants which may be used are between 0.001 and 0.1 parts by weight per 100 parts by weight of mixture depending on the size of cells desired.

It is advantageous to introduce into the composition of the mixture one or more products which enhance the stability of the paste during and after its expansion and prior to its setting to avoid any collapse. The products which may be used for this purpose are vinyl copolymers or polymers in aqueous suspension or solution such as polyvinyl acetate and its copolymers. The quantities of products used are 0.001 to 0.5 parts by weight per 100 parts by weight of mixture.

It is also advantageous to incorporate fibers of various types into the mixture to enhance the mechanical properties of the cellular material obtained. Good results are obtained with the majority of fibers which exist on the market, particularly with fibers of steel, asbestos, glass, vegetable fibers and the fibers of synthetic polymers such as polyamides, polyesters and polypropylene. The fibers may be used in proportions of the order of 0.1 to 5 parts by weight per 100 parts of mixture.

Instead of using compositions based on pure insoluble anhydrite, it is also possible to use compositions based on anhydrite mortars in which aggregates are associated with the anhydrite. The aggregates which may be used may vary widely. It is possible to use in particular, alone or in mixture, silica sands, silico-calcareous sands, flue dust, fly ash, slag sand, ground products based on schist, pumice stone, pozzolana, sooria or clinker. The granulometry of the aggregates for the cellular product preferably should have a maximum diameter of about 3 mm and at least about 80% by weight thereof having a diameter of less than about 1.25 mm. In the facing layers, the granulometry of the aggregates should preferably have a maximum diameter of about 6 mm and at least 80% by weight having a diameter of less than about 3 mm. The relative quantities of anhydrite and aggregate may vary according to the mechanical strength desired. In practice, it is advantageous to use at least 20 and preferably 30 parts by weight of anhydrite to 100 parts of a mixture of anhydrite and aggregates. The composition of an anhydrite mortar based mixture is the same as that given hereinabove, the anhydrite being replaced by the mixture of anhydrite and aggregates.

The anhydrite setting catalysts are well known to those skilled in the art. Examples of such catalysts include alkaline or neutral sulphates, the alums or the carbonates. Potassium sulphate is a setting catalyst which is particularly advantageous and it is the preferred catalyst. The setting catalyst or catalysts may be introduced into the mixture in the form of dry powder but it is preferable to introduce them in the form of solution and/or aqueous suspension in order to have a more homogeneous distribution within the mixture.

In order to render the finished material impermeable to water and atmospheric humidity, one or more water repellants may be introduced into the composition of the mixture. Among the numerous water repellants which may be used, the best are potassium and sodium siliconates or vinyl and acrylic polymers and copolymers, particularly copolymers of the methyl methacrylatebutyl methacrylate and butyl acrylate type. These products may be used at the rate of 0.1 to 1 part by weight per 100 parts by weight of mixture.

The present invention also relates to a method of producing composite building elements from a binder. Said elements, which comprise a cellular central layer sandwiched between two non-cellular facing layers, are obtained by pouring into the bottom of the mold a layer of binder forming the non-cellular bottom facing, pouring onto said first layer, before it sets, a layer of binder containing a porogenic system which forms the cellular central layer, and in pouring onto said cellular central layer before it hardens, a layer of binder forming the non-cellular top facing. The method is characterized by the fact that the binder is anhydrite and that the porogenic system is based on aluminum powder and one or more alkaline reagents. A porogenic system based on aluminum powder is highly advantageous compared to other porogenic systems in as much as, by choosing an aluminum powder which exhibits superficially a fine film of anhydrous alumina, the evolution of hydrogen as soon as the aluminum powder is in an alkaline medium is prevented and approximately 1 to 5 minutes are available before the evolution of hydrogen. This time is employed to disperse the aluminum powder in the mixture corresponding to the cellular central layer and to pour the mixture into the mold. Furthermore, the mechanical characteristics peculiar to the anhydrite binder make it possible to use building elements produced by the present method as load-bearing walls or as slabs.

The building elements which can be produced according to the present invention may be of any dimensions, but it is advantageous to make thicknesses of 4 to 30 cm for the cellular central layer and of 5 to 20 mm for the non-cellular facing layers, and lateral dimensions up to several meters.

According to the method of the invention the mixture used to form the non-cellular facing layers is obtained by mixing 100 parts by weight of anhydrite, 15 to 35 parts by weight of water, 0.50 to 5 parts by weight of one or more setting catalysts for the anhydrite, 0.2 to 2 parts by weight of one or more fluidizers as well as other adjuvants, such as from 1 to 20 parts by weight, and preferably from 1 to 10 parts by weight, of plaster intended to accelerate setting, and up to about 70 parts by weight of aggregates, coloring pigments, water retainers, water-proofing agents, etc.

The mixture used to form the cellular central layer is described above and advantageously comprises 100 parts by weight of anhydrite, 25 to 60 parts by weight of water, 0.50 to 2 parts by weight of one or more setting catalysts for the anhydrite, 0.1 to 5 parts by weight of an alkaline agent comprising one or more oxides or hydroxides of an alkaline earth metal or by one or more hydroxides of an alkaline metal or by a mixture of one of more oxides or hydroxides of an alkaline earth metal with one or more hydroxides of an alkaline metal, 0.01 to 0.20 parts by weight of a fine powder of aluminum, and possibly other adjuvants, such as from 1 to 20 parts by weight, and preferably from 1 to 10 parts by weight, of plaster intended to accelerate setting, 0.2 to 2 parts by weight of one or more fluidizers, and up to about 70 parts by weight of aggregates, surface active agents to reduce the size of the cells, water-proofing agents, stabilizers for the cellular structure, fibers intended to improve the mechanical properties, etc.

The plaster that can be used is calcium sulphate hemihydrate $CaSO_4.\frac{1}{2}H_2O$. The different types of plasters which are commercially available, building plaster, prefabrication plaster, molding plaster, etc., can be used.

The water retainers which can be used may vary widely. Examples of water retainers that can be used include: kieselguhr, colloidal clays such as bentonite or montmorillonite, colloidal products such as the alginates, cellulose derivatives such as methylcellulose, ethylcellulose, methylethylcellulose, hydroxypropylmethylcellulose, hydroxybutylmethylcellulose, carboxymethylcellulose, etc.

Among the numerous water-proofing agents which can be used, the best are the potassium and sodium siliconates or vinylic and acrylic copolymers, more particularly copolymers of the methyl methacrylate-butyl methacrylate-butyl acrylate type.

It is understood that the various adjuvants, such as the aggregates, fluidizers, coloring pigments, water retainers, water-proofing agents, surface active agents, etc., can be used in producing the cellular products as well as the non-cellular facing layers. The setting catalysts used in the production of the cellular products and the non-cellular facing layers can be the same or different.

In order to obtain good adhesion or union between the cellular central layer and the bottom facing layer, the cellular central layer is advantageously poured while the bottom facing layer has a sufficient consistency so that it will not be disturbed by the pouring, but before it has finished setting. Similarly, in order to obtain good adhesion or union between the top facing layer and the cellular layer, the top facing layer is advantageously poured while the cellular central layer has a sufficient consistency so that it will not be disturbed by the pouring, but before it has finished setting.

Before pouring the top facing layer it is advantageous to level the cellular central layer by means of a scraper or a roller supported on the top edges of the molds.

The anhydrite based mixture used to form the facing layers should be sufficiently fluid for the layers formed to be self-levelling. In order to obtain adequate fluidity, the concentration of batching water for a given quantity of fluidizer is adjusted. It is advantageous to use the aforementioned SMIDTH fluidity test: the spread diameter obtained 3 minutes after the start of batching should be between about 22 and 24 cm.

To enable the building elements to be assembled on the site in a particularly efficacious and simple manner, it is advantageous to equip them with mortises into which an anhydrite based mixture will be poured. For this purpose the mold is shaped in such a way that, when the building elements are assembled, the faces in contact exhibit, inside the contact surface and along the total length of the faces involved, an uninterrupted groove of any shape, for example dovetail, rectangular, semicircular and acting as a mortise. The shape and the positioning of the mortises may be such that the walls of the mortises can be constituted either solely by the cellular central layer, or partially by the cellular central layer and partially by one or the other of the two facing layers, or both simultaneously. The walls of the mortises shaped as has just been described and formed by the cellular central layer have a fine superficial film of non-cellular material formed over the cells. It may be advantageous to destroy this fine film in order to expose the open cells on the surface and thus to increase the adhesion between the cellular walls of the mortises and the anhydrite based joint. This operation can be performed easily either in the factory, or on site by means e.g., of a wire brush.

Instead of forming the mortises directly in the molding operation, it is also possible to form the mortises after the construction element has hardened by using any mechanical means, more particularly a means analogous, e.g., to one of those which are used in mortising wood.

The assembly of two building elements consists in assembling the two building elements contiguously by the faces equipped with a mortise so that the mortise of one of the elements directly faces the mortise of the other element, and so that the juxtaposition of the mortises of both building elements in contact forms a sheath and in pouring into said sheath, after having moistened its walls by any means, a fluidized anhydrite based mixture of a composition identical to that already described for the mixture used to form the facing layers.

It is likewise advantageous, in order to reinforce the walls or slabs formed with the building elements, to equip the belt formed by the mortise-against-mortise assembly of two building elements, before it is filled with the fluidized anhydrite based mixture, with a metallic armature, more particularly an armature of bare iron or iron treated with an antirust paint or a bituminous paint.

It is advantageous to use the reinforced material formed in the sheath by the mortise-against-mortise assembly of two building elements as a load-bearing pillar in cases where the building elements in question constitute a wall or as load-bearing beam in cases where the building elements in question constitute a slab.

The building elements according to the present invention exhibit high thermic insulation due to the presence of the low-density cellular central layer. Said elements likewise exhibit very good sound insulation due to the association of a light weight cellular material with a dense non-cellular material. It is in fact known that a material possessing this structure absorbs both low sound frequencies and high sound frequencies.

Due to the good mechanical properties both of the cellular central layer and of the facing layers, the building elements according to the present invention may advantageously constitute load-bearing walls such as exterior and interior walls or partition walls, and load-bearing slabs. They may likewise constitute non-load-bearing walls or non-load-bearing ceilings.

With the method of assembling the building elements as just described and reinforcing walls, partitions, slabs or ceilings by means of reinforced pillars or beams fabricated in situ by a particularly simple technique, the present invention permit a simple and rapid assembly of prefabricated houses.

The invention is illustrated by the following examples. In these examples, the mechanical properties of the cellular products are measured according to the French standard NF P 15451.

EXAMPLE 1

3,000 g phosphoanhydrite with a BLAINE surface area of 3,000 sq.cm/g obtained by calcining phosphogypsum, 1,140 ml of water at 44° C. containing 30 g potassium sulphate in solution and 30 g calcium hydroxide in suspension are blended in a mixer for 2½ minutes, after which 3 g of a lamellar aluminum powder dispersed in 60 ml of water are added and the mixture again blended for 30 seconds. The mixture is then poured into a mold measuring 16×20 cm. The temperature of the mixture is 30° C. Expansion commences 2 minutes after addition of the aluminum powder and continues for 20 minutes. The cellular product obtained is removed from the mold the following day. The dimension of the cells is less than 2.5 mm. At 28 days, the density is 0.56 and the mechanical properties are 11 bars under flexure and 27 bars under compression.

EXAMPLE 2

Example 1 is reproduced but using fluoroanhydrite with a BLAINE surface area of 4,000 sq.cm/g, a residue from the production of hydrofluoric acid, and containing 0.5% calcium hydroxide, the addition of calcium hydroxide being reduced to 15 g, and the temperature of the mixing water being adjusted in such a way that the temperature of the mixture in expansion in the mold is 25° C. The size of the cells is less than 2.5 mm. At 28 days, the density is 0.55 and the mechanical properties are 11 bars under flexure and 27 bars under compression.

EXAMPLE 3

Example 1 is reproduced but using in addition, in the mixing water, 0.15 g of a secondary alcohol sulphate as a surfactant. The size of the cells is less than 1 mm. At 28 days, the density is 0.60 and the mechanical properties are 11 bars under flexure and 26 bars under compression.

EXAMPLE 4

In a mixer, 100 kg phosphoanhydrite according to Example 1 are blended with 1 kg finely powdered potassium sulphate, 1 kg finely powdered calcium hydroxide and 0.050 kg finely powdered polyvinyl acetate. 38 liters of water at 44° C. are added and the resulting mixture blended for 3 minutes. Then 0.100 kg of powdered aluminum in suspension in 2 liters of water is added and the result mixed for 30 seconds, whereupon the mixture is poured into a mold measuring 60×110 cm×100 cm high. The paste, the temperature of which is 30° C., starts to rise 2 minutes after the addition of the powdered aluminum and lasts for 20 minutes. The height reached is 33 cm. The size of the cells is less than 1 mm. At 28 days, the density is 0.55 and the mechanical properties are 12 bars under flexure and 27 bars under compression.

EXAMPLE 5

3,000 g of the phosphoanhydrite according to Example 1 and 1.5 g powdered polyvinyl acetate are blended in a mixer and the result is mixed for 2 minutes and 30 seconds together with 750 ml of water containing 30 g potassium sulphate, 30 g calcium hydroxide and 22.5 g of a sodium polystyrene sulphonate fluidizing resin. Then, 3 g of aluminum powder dispersed in 60 ml of water are added and the result mixed for 30 seconds before pouring the mixture into a mold. The size of the cells is less than 1 mm. At 28 days, the density is 0.67 and the mechanical properties are 13 bars under flexure and 28 bars under compression.

EXAMPLE 6

Example 1 is reproduced but prior to mixing, 15 g of glass fibers are dispersed by being blended into the anhydrite. The glass fibers used have a diameter of 10 $\mu$m and a length of 6 mm. The cell size is less than 2.5 mm. At 28 days, the density is 0.56 and the mechanical properties are 14 bars under flexure and 28 bars under compression.

EXAMPLE 7

Example 1 is reproduced, but using in addition 10.5 g of a 45% potassium siliconate solution in the mixing water and care being taken to choose the temperature of the water in such a way that the final mixture under expansion is at a temperature of about 35° C. Expansion of the mixture starts 2 minutes after addition of the powdered aluminum and lasts 30 minutes. The cell size is less than 2 mm. At 28 days, the density is 0.58 and the mechanical properties are 10 bars under flexure and 25 bars under compression. The cellular material obtained offers increased impermeability to water.

EXAMPLE 8

Example 7 is reproduced but the potassium siliconate is replaced by 7.5 g of a methyl methacrylate-butyl methacrylate-butyl acrylate copolymer, and in addition 15 g of potassium hydroxide are used, dissolved in the mixing water. Expansion of the mixture commences 2 minutes after addition of the powdered aluminum and lasts for 40 minutes. The cell size is less than 1 mm. At 28 days, the density is 0.65 and the mechanical properties are 11 bars under flexure and 27 bars under compression. The cellular material obtained offers decreased permeability to water.

EXAMPLE 9

The same procedure is adopted as in Example 1, using 1,500 g of phosphoanhydite with a BLAINE surface area of 3,000 sq.cm/g, 1,500 g silica sand (0.050/0.250 mm), 975 ml of water, 25 g potassium sulphate, 30 g calcium hydroxide and 3 g of powdered aluminum. Expansion commences 3 minutes after the addition of the powdered aluminum and lasts 20 minutes. The cell size is less than 2.5 mm. At 28 days, the density is 0.50 and the mechanical properties are 6 bars under flexure and 13 bars under compression.

EXAMPLE 10

A mixture containing 95 parts by weight of anhydrite, BLAINE surface 3,000 cm2/g, obtained by roasting phosphogypsum, 5 parts by weight of the fine building plaster PFC2, 1 part by weight of potassium sulphate, 1 part by weight of calcium hydroxide, 0.75 part by weight of a polystyrene sodium sulphonate fluidizer of low molecular weight, and 23 parts by weight of water are mixed for 3 minutes. The SMIDTH test yields, at the end of the mixing, a spread diameter of 23 cm and the final setting time of the mixture is 50 minutes. A layer of 10 mm of this mixture is then poured onto the bottom of a 50 cm×50 cm mold 25 cm high, which has previously been treated with a suitable mold release composition. 100 parts by weight of anhydrite of the same quality as that used in the bottom facing layer is then mixed in a mixer with 1 part by weight of calcium hydroxide powder and 0.05 part by weight of polyvinyl acetate powder as a stabilizer. 38 parts by weight of water at 44° C. are added and the composition mixed for 3 minutes. Then 0.1 parts by weight of a fine aluminum powder in suspension in 2 parts by weight of water is added and mixing continued for 30 seconds, after which the mixture is poured onto the bottom facing layer. Between the start of mixing the composition of the first facing layer and the pouring of the central layer, a period of 12 minutes elapsed. The rise of the paste, the temperature of which is 30° C., is complete 20 minutes after the end of mixing and the height of the layer after total expansion is 23.5 cm. One and a half hours after the commencement of mixing of the mixture for the first facing layer, the cellular central layer is levelled by means of a roller so as to bring it to a uniform height of 22.5 cm, and a 15 mm facing layer of a mixture identical to that used for pouring the bottom facing layer is poured onto said central layer. Approximately 6 hours after the start of the operation, a composite building element 50 cm×50 cm×25 cm is removed from the mold, which after 7 days exhibits the following characteristics: density of cellular central layer: 0.56, density of facing layers: 2.02, ROCKWELL hardness of facing layers (to standard ASTM E 18, method A, scale R): 98.

EXAMPLE 11

Two building elements 50×cm50 cm×25 cm are produced according to Example 10, and after hardening, a mortise is made in each of them by mechanical means on a 50 cm×25 cm face and in the cellular central layer. These mortises have the shape of a hemicylinder, the axis of which coincides with the major median axis of the relevant face, and the diameter of which is 12 cm. After having moistened the cellular walls of the two mortises with a brush soaked in water, the two building elements are assembled, mortise-against-mortise, so as to form by the junction of the two mortises a vertical cylindrical sheath 50 cm high and 12 cm in diameter. Said sheath is fitted with a bare iron armature and a fluid mixture obtained by mixing 90 parts by weight of anhydrite of the same quality as that of Example 1, 10 parts by weight of fine building plaster PFC2, 1 part by weight of potassium sulphate, 1 part by weight of calcium hydroxide, 0.01 part by weight of methylcellulose, 0.75 parts by weight of a polystyrene sodium sulphonate fluidizer of low molecular weight and 23 parts by weight of water is poured into it. The final setting time of this mixture is 20 minutes. After hardening, the two building elements are jointed together in a particularly solid bond.

EXAMPLE 12

The same procedure is followed as in Example 10, but two opposite 50 cm×25 cm faces of the mold are equipped with a hemicylinder of 12 cm diameter entering into the mold and applied along the entire length of both faces and in their center. After removal from the mold, a composite building element 50 cm×50 cm×25 cm is obtained presenting on two opposite 50 cm×25 cm faces a mortise completely contained in the cellular central layer and in the form of a hemicylinder of 12 cm diameter and 50 cm long. This operation is repeated so as to obtain a second building element identical to the first. After the two building elements have hardened, the cells of the cellular walls forming the mortises are opened with a wire brush, then the two building elements are assembled in the manner described in Example 11, except for the difference that the fluid mixture poured into the does not contain methylcellulose. After the joint has hardened the two building elements are attached together in a particularly solid bond.

I claim:

1. Method of producing composite building elements comprising a cellular central layer sandwiched between two non-cellular facing layers which comprises pouring into the bottom of a mold a first facing layer comprised of an insoluble anhydrite binder containing an anhydrite setting catalyst and capable of being set to form a non-cellular layer, pouring onto said first layer a central layer comprised of an insoluble anhydrite binder, an anhydrite setting catalyst and containing a porogenic system comprising aluminum powder and an alkaline agent which produces a gas by reaction with the aluminum powder, and pouring onto said central layer before it sets and after it has expanded a second facing layer comprised of an insoluble anhydrite binder containing an anhydrite setting catalyst and capable of being set to form a non-cellular layer, said anhydrite binders comprising at least about 15% by weight of particles having a diameter of less than about 10 $\mu$m and at least about 20% by weight of particles having a diameter in excess of about 20 $\mu$m and having a mean or average diameter of between about 5 and 30 $\mu$m, the anhydrite likewise being characterized by a Blaine surface area between about 1000 and 8000 sq. cm./g, and permitting the layers to harden into a strong unitary composite building element.

2. Method according to claim 1, characterized in that the composition used to form the cellular central layer comprises about 100 parts by weight of anhydrite, 25 to 75 parts by weight of water, 0.50 to 2 parts by weight of a setting catalyst for the anhydrite, 0.1 to 5 parts by weight of a composition of an alkaline agent comprising an oxide or hydroxide of an alkaline earth metal or a hydroxide of an alkaline metal or of a mixture of oxides or hydroxides of an alkaline earth metal with hydroxides of an alkaline metal, 0.01 to 0.20 parts by weight of aluminum powder and from 0 to 2 parts by weight of a fluidizer.

3. Method according to claim 2, characterized in that the composition used to form the cellular central layer comprises up to 70 parts by weight of inert aggregates.

4. Method according to claim 2, characterized in that the composition used to form the cellular central layer contains from about 1 to 20 parts by weight of plaster.

5. Method according to claim 1, characterized in that the composition used to form the facing layers contains about 100 parts by weight of anhydrite, 15 to 35 parts by weight of water, 0.50 to 5 parts by weight of a setting catalyst for the anhydrite, and 0.2 to 2 parts by weight of a fluidizer.

6. Method according to claim 5, characterized in that the composition used to form the facing layers contains up to about 70 parts by weight of inert aggregates.

7. Method according to claim 5, characterized in that the composition used to form the facing layers contains from about 2 to 20 parts by weight of plaster.

8. Method according to claim 6, characterized in that the composition used to form the facing layers contains from about 2 to 20 parts by weight of plaster.

9. Method according to claim 1, characterized in that the composition used to form the cellular central layer or the composition used to form the facing layers of all composition contains one or more water-proofing agents.

10. Method according to claim 9, characterized in that the water-proofing agent is potassium or sodium siliconate or an acrylic copolymer and comprises from about 0.1 to 1 part by weight per 100 parts by weight of composition.

11. Method according to claim 1, characterized in that the building elements are provided with a mortise during the molding thereof.

12. Composite building elements produced according to the method of claim 1.

13. Composite building elements produced by the method of claim 11 in which the faces are equipped with a mortise so that the mortise of one of the elements faces directly opposite the mortise of another element to form a sheath which is filled with an anhydrite binder.

* * * * *